United States Patent
Reynoso et al.

(10) Patent No.: US 12,168,315 B2
(45) Date of Patent: Dec. 17, 2024

(54) MOLDED ARTICLES HAVING DECORATIVE EFFECT, AND METHODS FOR PREPARING THE MOLDED ARTICLES

(71) Applicant: Dow Global Technologies LLC, Midland, MI (US)

(72) Inventors: Sara Luisa Reynoso, Mexico City (MX); Jorge Caminero Gomes, São Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 519 days.

(21) Appl. No.: 17/624,090

(22) PCT Filed: Jun. 30, 2020

(86) PCT No.: PCT/US2020/040223
§ 371 (c)(1),
(2) Date: Dec. 30, 2021

(87) PCT Pub. No.: WO2021/003117
PCT Pub. Date: Jan. 7, 2021

(65) Prior Publication Data
US 2022/0396015 A1    Dec. 15, 2022

Related U.S. Application Data

(60) Provisional application No. 62/869,771, filed on Jul. 2, 2019.

(51) Int. Cl.
| | | |
|---|---|---|
| C08K 3/013 | (2018.01) | |
| B29C 45/00 | (2006.01) | |
| C08K 5/20 | (2006.01) | |
| B29L 31/56 | (2006.01) | |

(52) U.S. Cl.
CPC .......... *B29C 45/0001* (2013.01); *C08K 3/013* (2018.01); *C08K 5/20* (2013.01); *B29L 2031/56* (2013.01)

(58) Field of Classification Search
CPC ... C08K 5/0041; C08K 3/013; C08L 2310/00; C08L 23/0876; C08L 77/00; C08L 77/06
See application file for complete search history.

(56) References Cited

U.S. PATENT DOCUMENTS

| | | | |
|---|---|---|---|
| 2,897,183 A | 7/1959 | Christl et al. | |
| 3,404,134 A | 10/1968 | Watkin | |
| 4,810,733 A * | 3/1989 | Sakuma | C08J 3/226 524/400 |
| 5,028,674 A | 7/1991 | Hatch et al. | |
| 5,151,324 A | 9/1992 | Hanatani et al. | |
| 5,536,772 A | 7/1996 | Dillman et al. | |
| 5,696,200 A | 12/1997 | Maeda et al. | |
| 5,788,890 A * | 8/1998 | Grey | B29C 45/1634 264/73 |
| 6,194,507 B1 * | 2/2001 | Ali | C08K 3/08 524/786 |
| 6,395,833 B1 | 5/2002 | Tasaka et al. | |
| 6,518,365 B1 | 2/2003 | Powell et al. | |
| 7,498,282 B2 | 3/2009 | Patel et al. | |
| 8,906,479 B2 | 12/2014 | Chou et al. | |
| 2008/0081874 A1 | 4/2008 | Balfour et al. | |
| 2008/0097047 A1 * | 4/2008 | Reynoso Gomez | C08L 77/02 525/523 |
| 2013/0172248 A1 | 7/2013 | Defossa et al. | |
| 2016/0208059 A1 * | 7/2016 | Van Kessel | C08J 3/226 |
| 2017/0210877 A1 | 7/2017 | Mulholland et al. | |

FOREIGN PATENT DOCUMENTS

| | | |
|---|---|---|
| CN | 102504599 A | 6/2012 |
| CN | 108699290 A | 10/2018 |
| EP | 0085115 A1 | 10/1983 |
| EP | 0254523 A2 | 1/1988 |
| EP | 0293254 A2 | 11/1988 |
| EP | 0423590 A2 | 4/1991 |
| EP | 0892708 A1 | 1/1999 |

(Continued)

OTHER PUBLICATIONS

Brazilian Office Action dated Oct. 10, 2023, pertaining to BR Patent Application No. BR112021026680-1, 4 pgs.

(Continued)

*Primary Examiner* — Robert C Boyle
(74) *Attorney, Agent, or Firm* — Dinsmore & Shohl LLP

(57) ABSTRACT

Molded articles having a decorative effect include at least 75% by weight neutralized acid copolymer. The molded articles include from 0.1% to 5% by weight polyamide-based pigment masterbatch. The polyamide-based pigment masterbatch includes from 30% to 95% by weight polyamide and from 5% to 70% by weight of a first pigment associated with the polyamide. The molded articles further include from 0.1% to 5% by weight of a second pigment derived from a liquid-based pigment masterbatch; and from 0.1% to 0.7% by weight of oil-based carrier derived from the liquid-based pigment masterbatch. Methods for preparing the molded articles include dry blending a neutralized acid copolymer, a polyamide-based pigment masterbatch, and a liquid-based pigment masterbatch to form an initial mixture; feeding the initial mixture to an injection molding apparatus; and molding the initial mixture with the injection molding apparatus to form the molded article.

20 Claims, No Drawings

(56) References Cited

FOREIGN PATENT DOCUMENTS

| EP | 2842987 A1 | 3/2015 |
|---|---|---|
| JP | H07-179750 A | 7/1995 |
| JP | 2000186152 A | 7/2000 |
| JP | 3200841 B2 | 8/2001 |
| JP | 6093189 B2 | 3/2017 |
| WO | 9104299 | 4/1991 |
| WO | 2013/101891 A1 | 7/2013 |
| WO | 2021003117 A1 | 1/2021 |

OTHER PUBLICATIONS

Chinese Office Action dated Jan. 11, 2024, pertaining to CN Patent Application No. 202080048916.8, 15 pgs.
International Search Report and Written Opinion issued by the European Patent Office acting as International Searching Authority for International Patent Application No. PCT/US2020/040223 dated Oct. 2, 2020 (38 total pages).
Examination Report dated May 9, 2023, pertaining to EP Patent Application No. 20754411.5.
Biedermann et al. "Comprehensive two-dimensional gas chromatography for characterizing mineral oils in foods and distinguishing them from synthetic hydrocarbons" Journal of Chromatography A, 1375 (2015) 146-153, 8 pgs.
Hasch et al., in "High-Pressure Phase Behavior of Mixtures of Poly(Ethylene-co-Methyl Acrylate) with Low-Molecular Weight Hydrocarbons," Journal of Polymer Science: Part B.
International Preliminary Report on Patentability for International Patent Application No. PCT/US2020/040223 dated Jan. 13, 2022 (10 pages).
Japanese Office Action dated Jun. 25, 2024, pertaining to JP Patent Application No. 2021-577474, 10 pgs.
Chinese Office Action dated Aug. 1, 2024, pertaining to CN Patent Application No. 202080048916.8, 6 pgs.

* cited by examiner

MOLDED ARTICLES HAVING DECORATIVE EFFECT, AND METHODS FOR PREPARING THE MOLDED ARTICLES

CROSS REFERENCES TO RELATED APPLICATIONS

This application is a national-stage application under 35 U.S.C. § 371 of International Application No. PCT/US2020/040223, filed Jun. 30, 2020, which International Application claims priority to U.S. Provisional Patent Application No. 62/869,771, filed on Jul. 2, 2019, the entire disclosure of which is hereby incorporated by reference.

TECHNICAL FIELD

The present disclosure relates generally to molded articles and, more particularly, to molded articles having a decorative effect.

BACKGROUND

Neutralized acid copolymers such as ionomer resins are materials having highly desirable properties for uses in molded articles including, but not limited to, cosmetics containers and perfume bottles. In particular, the neutralized acid copolymers are well suited for the types of injection molding processes for forming such articles. The ability to decorate such molded articles or to create with the molded articles unusual or remarkable visual effects is of high value to manufacturers of consumer products and to the consumers themselves.

The ability to form molded articles from molding processes such as injection molding, for example, typically relies on numerous properties of the material being molded. Though a particular material being molded may be quite amenable to a molding process in raw form, the addition of ingredients such as pigments in the interest of creating desirable visual effects can alter the properties of the material being molded in a manner that substantially complicates the molding process. In turn, an artistic expectation of a certain visual effect can be hampered by the inability of the molding process to incorporate the additional ingredients that would be required to accomplish such effects.

One specific, highly desirable visual effect for molded articles includes a decoration pattern including streaks of color simulating the patterns in stone such as marble or in naturally weathered or tarnished metals. Though marble-type effects have been realized to a limited extent in neutralized acid copolymer molded articles by including pigmented polyamides into a blend with the copolymer, the effects are limited to streak-like patterns in an otherwise transparent or translucent matrix of copolymer. There remain ongoing needs for additional varieties of decorative effects in molded articles prepared from neutralized acid copolymer materials, as well as for methods of preparing the molded articles in a manner that incorporates additional ingredients while retaining efficient reproducibility and automatization of the molding process at a large scale.

SUMMARY

Against the above background, embodiments of this disclosure relate to molded articles having a decorative effect. The molded articles include at least 75% by weight, based on the total weight of the molded article, of a neutralized acid copolymer. The molded articles further include from 0.1% to 5% by weight, based on the total weight of the molded article, of a polyamide-based pigment masterbatch. The polyamide-based pigment masterbatch includes from 30% to 95% by weight polyamide, based on the total weight of the polyamide-based pigment masterbatch, and from 5% to 70% by weight of a first pigment associated with the polyamide, based on the total weight of the polyamide-based pigment masterbatch. The molded articles further include from 0.1% to 5% by weight, based on the total weight of the molded article, of a second pigment derived from a liquid-based pigment masterbatch; and from 0.1% to 0.7% by weight, based on the total weight of the molded article, of oil-based carrier derived from the liquid-based pigment masterbatch.

Further embodiments of this disclosure relate to methods for preparing the molded articles and to molded articles prepared by the methods. The methods include dry blending a neutralized acid copolymer, a polyamide-based pigment masterbatch, and a liquid-based pigment masterbatch to form an initial mixture; feeding the initial mixture to an injection molding apparatus; and molding the initial mixture with the injection molding apparatus to form the molded article. The initial mixture includes, based on the total weight of the initial mixture, at least 75% by weight of the neutralized acid copolymer; from 0.1% to 5% by weight of the polyamide-based pigment masterbatch; and from 0.2% to 5.7% by weight of the liquid-based pigment masterbatch. The polyamide-based pigment masterbatch may include from 30% to 95% by weight polyamide, based on the total weight of the polyamide-based pigment masterbatch, and from 5% to 70% by weight of a first pigment associated with the polyamide, based on the total weight of the polyamide-based pigment masterbatch. The liquid-based pigment masterbatch may include from 5% to 60% by weight of a second pigment, based on the total weight of the liquid-based pigment masterbatch, and from 40% to 95% by weight of an oil-based carrier, based on the total weight of the liquid-based pigment masterbatch.

These and other features, aspects, and advantages of the present invention will become better understood with reference to the following description and the appended claims.

Additional features and advantages of the embodiments described herein will be set forth in the detailed description which follows, and in part will be readily apparent to those skilled in the art from that description or recognized by practicing the embodiments described herein, including the detailed description which follows, including, but not limited to, the appended claims.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification.

DETAILED DESCRIPTION

Reference will now be made in detail to embodiments of molded articles having a decorative effect. Methods for preparing the molded articles will be described subsequently.

Molded articles according to embodiments may include at least 75% by weight neutralized acid copolymer, based on the total weight of the molded article. The molded articles further include from 0.1% to 5% by weight polyamide-based pigment masterbatch, based on the total weight of the molded article. The polyamide-based pigment masterbatch may include from 30% to 95% by weight polyamide, based on the total weight of the polyamide-based pigment masterbatch, and from 5% to 70% by weight of a first pigment associated with the polyamide, based on the total weight of the polyamide-based pigment masterbatch. In some embodiments, the polyamide is a nylon such as nylon-6. The molded articles further may include from 0.1% to 5% by weight of a second pigment derived from a liquid-based pigment masterbatch, based on the total weight of the molded article; and from 0.1% to 0.7% by weight of oil-based carrier derived from the liquid-based pigment masterbatch, based on the total weight of the molded article.

The molded articles according to embodiments exhibit a decorative effect that arises from the interactions of the components of the molded articles during a molding process such as an extrusion or an injection molding. For example, the neutralized acid copolymer, absent any additional components, may be a substantially optically clear or transparent material. The first pigment, associated with the polyamide-based pigment masterbatch formulation, may impart non-uniform streaks of color through the volume of the molded article. The second pigment, based on the liquid-based pigment masterbatch, may impart a substantially uniform coloring throughout the volume of the molded article. Accordingly, the decorative effect in the article may include a marbleized pattern of streaks from the first pigment on a blank pallet of uniform color from the second pigment. The uniform blank pallet created by the second pigment may render the otherwise substantially clear or transparent neutralized acid polymer translucent or substantially opaque. If the neutralized acid polymer is substantially opaque from the second pigment, the streaks of color from the first pigment may resemble the pattern of color streaks naturally found in decorative stone or metallic objects.

The decorative effect in the molded article may result from the phase morphology of the components of the molded article. For example, in the molded article, the neutralized acid copolymer may be a continuous phase within the molded article. In the same molded article, the polyamide-based pigment masterbatch, including the first pigment and an associated polyamide such as nylon-6, for example, may be present as a first secondary phase within the molded article. The first secondary phase is not homogeneously distributed within the continuous phase. In the same molded article, the second pigment derived from the liquid-based pigment masterbatch may be present as a second secondary phase within the molded article. The second secondary phase may or may not be homogeneously distributed within the continuous phase. In the same molded article, the oil-based carrier may be present as a third secondary phase within the molded article. The third secondary phase may or may not be homogeneously distributed within the continuous phase. In some embodiments, the first secondary phase is not homogeneously distributed within the continuous phase, and one or both of the second secondary phase and the third secondary phase are homogeneously distributed within the continuous phase.

Examples of decorative effects of the molded articles according to embodiments may include, without limitation, gray-stone effects, white marble with brown streaks, black marble with white streaks, oxidized metal finishes, old brass, rustic copper, onyx finishes, and obsidian finishes. Based on a desired decorative effect such as a gray stone, white-light brown marble, or oxidized metal, a background color or blank canvas may be chosen together with a streaking color, whereupon suitable pigments may be chosen for preparing a formulation or initial mixture to be molded. For example, for a gray stone or white marble, white liquid pigment may be used as the background and black or light brown solid color concentrate based on a polyamide such as nylon-6 may be used for the streaks. For onyx or obsidian finish, the background color may be achieved from a black liquid pigment and a white solid color concentrate based on a polyamide such as nylon-6 for the streaks. For a metal finish, a copper or silver liquid pigment may be included to achieve a metallic background color, and a combination of black with light brown solid color concentrates based on a polyamide such as nylon-6 may be used for the streaks.

According to embodiments, the neutralized acid copolymer of the molded article may be an ionomer resin. In some embodiments, the neutralized acid copolymer may be a neutralized ethylene acid copolymer. The molded article may include at least 75% by weight, or at least 80% by weight, or at least 85% by weight, or at least 90% by weight, or at least 95% by weight neutralized acid copolymer, based on the total weight of the molded article.

Ionomer resins can be produced by any means known to one skilled in the art, such as by neutralization of an ethylene acid copolymer with one or more metal ions. An ethylene acid copolymer is a polymer that includes repeat units derived from ethylene and about 1% to about 50%, or about 5% to about 40%, or 10% to 25%, by weight of a comonomer such as acrylic acid, methacrylic acid, ethacrylic acid, or combinations of two or more thereof, based on the total weight of the ethylene copolymer. Ionomer resins in general are well known to one skilled in the art.

Examples of ethylene acid copolymers may include up to 35 wt. % of an optional comonomer such as carbon monoxide, sulfur dioxide, acrylonitrile, maleic anhydride, maleic acid diesters, maleic acid, maleic acid monoesters, itaconic acid, fumaric acid, fumaric acid monoester, a salt of these acids, glycidyl acrylate, glycidyl methacrylate, and glycidyl vinyl ether, methyl acrylate, ethyl acrylate, isopropyl acrylate, butyl acrylate, pentyl acrylate, methyl methacrylate, ethyl methacrylate, propyl methacrylate and butyl methacrylate, pentyl methacrylate, or combinations of two or more thereof where the alkyl group can be linear or branched.

Acid groups of an ionomer resin are at least partly neutralized. The neutralization of acid groups in ionomer resins can range, for example, from about 0.1% to about 100%, or about 10% to about 90%, or about 20% to about 80%, or about 30% to about 60%, or about 20% to about 40% of carboxylic acid groups in the ionomer resin being neutralized with a metallic ion, based on the total carboxylic acid content. The metallic ions may be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, and combinations of two or more thereof. If the metallic ion is multivalent, a complexing agent, such as stearate, oleate, salicylate, and phenolate radicals can be included, as disclosed in U.S. Pat. No. 3,404,134. Specific examples of neutralizing metal ions include Na, Zn, or combinations thereof. Further examples include sodium or zinc ions derived from salts such as NaOH, $NaHCO_3$, $Na_2CO_3$, $NaHSO_4$, $NaH_2PO_4$, $Na_2HPO_3$, sodium stearate, sodium oleate, sodium salicylate, sodium phenolate, $Zn(OH)_2$, $ZnCO_3$, $ZnCO_3$, $ZnSO_4$, $ZnHPO_4$, $ZnHPO_3$, zinc oxide, zinc stearate, zinc oleate, zinc salicylate, zinc phenolate, $Mg(OH)_2$, $MgCO_3$, $MgCO_3$, $MgSO_4$, $MgHPO_4$, $MgHPO_3$, magnesium stearate, magnesium oleate, magnesium salicylate, magnesium phenolate, or combinations of two or more thereof.

In embodiments, the neutralized acid copolymer of the molded article may be an ionomer resin having a melt flow index from 4 g/10 min to 6 g/10 min, as measured according to ASTM D1238. In embodiments, the neutralized acid copolymer of the molded article may be an ethylene methacrylic acid copolymer in which methacrylic acid groups of the copolymer are at least partially neutralized with sodium ions. In embodiments, the neutralized acid copolymer of the molded article may include from 15% to 30% or from 15% to 20% by weight copolymerized units of acrylic acid or methacrylic acid, and 70% to 85% by weight copolymerized units of ethylene, based on the total weight of the neutralized acid copolymer. In embodiments, the neutralized acid copolymer of the molded article may have about 30% to about 70%, or from 30% to 60%, or from 40% to 70% of carboxylic acid groups of the neutralized acid copolymer being neutralized as carboxylic acid salts comprising sodium cations.

In embodiments, the neutralized acid copolymer may be an ionomer formed from a partially neutralized precursor acid copolymer. The precursor acid copolymer may include copolymerized units of ethylene and from 5% to 30% by weight copolymerized units of an α,β-ethylenically unsaturated carboxylic acid having 3 to 8 carbon atoms, based on the total wt. % of the precursor acid copolymer. All individual values and subranges of from 5 wt. % to 30 wt. % are included and disclosed herein. For example, in some embodiments, the precursor acid copolymer includes copolymerized units of ethylene and from 5% to 25% by weight, from 7% to 25% by weight, or from 7% to 22% by weight copolymerized units of an α,β-ethylenically unsaturated carboxylic acid having 3 to 8 carbon atoms, based on the total wt. % of the precursor acid copolymer. The comonomer content may be measured using any suitable technique, such as techniques based on nuclear magnetic resonance ("NMR") spectroscopy, and, for example, by $^{13}$C NMR analysis as described in U.S. Pat. No. 7,498,282, which is incorporated herein by reference.

Examples of suitable α,β-unsaturated carboxylic acids having 3 to 8 carbon atoms may include, without limitation, acrylic acids, methacrylic acids, itaconic acids, maleic acids, fumaric acids, monomethyl maleic acids, and combinations of two or more of these acid comonomers. In some embodiments, the α,β-unsaturated carboxylic acids having 3 to 8 carbon atoms comprises acrylic acid and methacrylic acid. In other embodiments, the α,β-unsaturated carboxylic acids having 3 to 8 carbon atoms comprises acrylic acid.

The partially neutralized precursor acid copolymer has a melt index, I2, of 10 g/10 min to 4,000 g/10 min. The melt index, I2, is determined according to ASTM D1238 at 190° C., 2.16 kg. All individual values and subranges of 10 g/10 min to 4,000 g/10 min are included and disclosed herein. For example, in some embodiments, the partially neutralized precursor acid copolymer may have a melt index, I2, of 10 g/10 min to 2,500 g/10 min, 10 g/10 min to 1,250 g/10 min, 25 g/10 min to 1,000 g/10 min, 25 g/10 min to 750 g/10 min, 50 g/10 min to 500 g/10 min, or 100 g/10 min to 450 g/10 min.

The partially neutralized precursor acid copolymers may be synthesized in a continuous process in which each of the reactive comonomers and the solvent(s), if any, are continuously fed, together with initiator, into a stirred reactor. The choice of initiator is based on the anticipated reactor temperature range coupled with the decomposition temperature of the initiator, the criteria for this selection being well-understood in the industry. In general, during the synthesis by copolymerization of ethylene and acid comonomers to produce the precursor acid copolymer, the reaction temperature may be maintained at about 120° C. to about 300° C., or about 140° C. to about 260° C. The pressure in the reactor may be maintained at about 130 MPa to about 310 MPa, or about 165 MPa to 250 MPa.

The reactor may be, for example, an autoclave reactor, such as those described in U.S. Pat. No. 2,897,183, which describes a type of autoclave reactor that is equipped with means for intensive agitation. U.S. Pat. No. 2,897,183 describes also a continuous process for the polymerization of ethylene under a "substantially constant environment." This environment is maintained by keeping certain parameters, for example, pressure, temperature, initiator concentration, and the ratio of polymer product to unreacted ethylene, substantially constant during the polymerization reaction. Such conditions may be achieved in any of a variety of continuously stirred tank reactors, among them, for example, continuously stirred isothermal reactors and continuously stirred adiabatic reactors.

The reaction mixture, which contains the precursor acid copolymer, is vigorously agitated and continuously removed from the autoclave. After the reaction mixture leaves the reaction vessel, the resulting precursor acid copolymer product is separated from the volatile unreacted monomers and solvent(s), if any, by conventional procedures, such as by vaporizing the unpolymerized materials and solvent(s) under reduced pressure or at an elevated temperature. Non-limiting examples of precursor acid copolymers include copolymers under the tradename NUCREL™, available from The Dow Chemical Company.

In general, to obtain the neutralized acid copolymers that are ionomer formed from a partially neutralized precursor acid copolymer, during the polymerization reaction, the reactor contents may be maintained under conditions such that a single phase is present substantially throughout the reactor. This can be accomplished by adjusting reactor temperature, by adjusting reactor pressure, by addition of co-solvents, or by any combination of these techniques, as described in U.S. Pat. No. 5,028,674. Conventional means may be used to determine whether a single phase is maintained substantially throughout the reactor. For example, Hasch et al., in "High-Pressure Phase Behavior of Mixtures of Poly(Ethylene-co-Methyl Acrylate) with Low-Molecular Weight Hydrocarbons," Journal of Polymer Science: Part B: Polymer Physics, Vol. 30, 1365-1373 (1992), describe a cloud-point measurement that can be used in determining the boundary between single phase and multiphase conditions.

To obtain ionomers useful as the neutralized acid copolymer in the molded articles according to embodiments of this disclosure, the precursor acid copolymers are neutralized with a base comprising a metal cation such that the acid groups (for example, carboxylic acid) in the precursor acid copolymer react to form acid salt groups (for example, carboxylate salts). In embodiments herein, about 25% to about 65%, or about 30% to about 60%, or about 35% to about 60%, or about 30% to about 55%, or about 35% to about 55% of the acid groups derived from the α,β-ethylenically unsaturated carboxylic acid of the precursor acid copolymer are neutralized. The neutralization level of the acid groups derived from the α,β-ethylenically unsaturated carboxylic acid of the precursor acid copolymer may be calculated based on the amount of basic metal compound added or measured using infrared spectroscopy. Actual neutralization levels may be determined using infrared spectroscopy by comparing an absorption peak attributable to carboxylate anion stretching vibrations at 1530 cm$^{-1}$ to 1630 cm$^{-1}$ and an absorption peak attributable to carbonyl stretching vibrations at 1690 cm$^{-1}$ to 1710 cm$^{-1}$. The amount of basic metal compound capable of neutralizing acidic groups may be provided by adding the stoichiometric amount of the basic compound calculated to neutralize a target amount of acid moieties in the acid copolymer. Non-limiting examples of ionomers include ionomers under the tradename SUR-LYN™ available from The Dow Chemical Company.

Any stable cation and any combination of two or more stable cations are believed to be suitable as counterions to the acid groups in the ionomer. The counterions to the acid groups in the ionomer may include, for example, divalent and monovalent cations, such as cations of alkali metals, alkaline earth metals, and some transition metals. In some embodiments, the cation is a divalent cation such as, zinc, calcium, or magnesium, for example. In other embodiments, the cation is a monovalent cation such as potassium or sodium, for example. In further embodiments, the acid groups derived from the α,β-ethylenically unsaturated carboxylic acid of the precursor acid copolymer are neutralized by a base containing sodium ions. The base containing sodium ions can provide a sodium ionomer wherein the hydrogen atoms of the acid groups of the precursor acid are replaced by sodium cations. To obtain the ionomers useful as the neutralized acid copolymer in embodiments, the precursor acid copolymers may be neutralized by any conventional procedure, such as those described in U.S. Pat. Nos. 3,404,134 and 6,518,365.

According to embodiments, the molded article includes from 0.1% to 5% by weight, or from 0.1% to 2% by weight, or from 0.1% to 1% by weight, or from 0.1% to 0.7% by weight polyamide-based pigment masterbatch, based on the total weight of the molded article. The polyamide-based pigment masterbatch includes a polyamide and a first pigment associated with the polyamide. In example embodiments, the polyamide-based pigment masterbatch may include from 30% to 95% by weight polyamide, based on the total weight of the polyamide-based pigment masterbatch, and from 5% to 70% by weight of a first pigment associated with the polyamide, based on the total weight of the polyamide-based pigment masterbatch. In some embodiments, the molded article may include multiple polyamide-based pigment masterbatches. In such embodiments, the molded article includes from a total of 0.1% to 5% by weight, or from 0.1% to 2% by weight, or from 0.1% to 1% by weight, or from 0.1% to 0.7% by weight of all the polyamide-based pigment masterbatches, based on the total weight of the molded article.

In the molded article, the polyamide-based pigment masterbatch may form the first secondary phase in a continuous phase of neutralized acid copolymer. The first secondary phase may be distributed within the volume of the neutralized acid copolymer in patterns resembling specks or streaks, for example. In this regard, the association of the first pigment with the polyamide may manifest itself within the molded article in that the first pigment remains within the first secondary phase and does not leach or leak out to impart color to the continuous phase of neutralized acid copolymer while being separated from or isolated from a polyamide matrix that makes up the first secondary phase. The association of the first pigment with the polyamide may include chemical bonding, detectable and verifiable by known analytical techniques, between molecules of the first pigment and the polyamide.

Polyamide-based pigment masterbatches are well known to those skilled in the art of molded plastics. The polyamide-based pigment masterbatches in general may be pigment molecules homogeneously dispersed within a polyamide matrix. Polyamide-based pigment masterbatches are available in bulk forms such as pellets, for example. The pellets may be added to bulk forms of the neutralized acid copolymer in preparation for a molding process such as extrusion or injection molding, for example.

Examples of polyamide components of polyamide-based pigment masterbatches include homopolyamide, a copolyamide, a mixture or blend of polyamides or of a polyamide and another polymer. Exemplary homopolyamides and copolyamides include those made from ω-aminocaproic acid, ω-aminoenanthoic acid, ω-aminocaprylic acid, ω-aminopelargonic acid, ω-aminocapric acid, ω-aminoundecanoio acid, a)-aminolauric acid, caprolactam, lactam-7, lactam-8, lactam-9, lactam-10, lactam-11 and/or laurolactam. The polyamides may be selected from the group of polyamides made, for example, from dimethylenediamine, trimethylenediamine, tetramethylenediamine, pentamethylenediamine, hexamethylenediamine, polyetherdiamine and mixtures thereof on the one hand; and oxalic acid, malonic acid, succinic acid, glutaric acid, adipic acid, pimelic acid, suberic acid, azelaic acid, sebacic acid, nonedicarboxylic acid, decanedicarboxylic acid, undecanedioic acid, dodecanedioic acid, dimerised fatty acids and mixtures thereof on the other hand. Specific examples of polyamides include nylons such as nylon-6, for example.

In some embodiments, the polyamide of the polyamide-based pigment masterbatch may have a Vicat softening point that is less than the temperature at which the neutralized acid copolymer fully plasticizes after a molding process such as extrusion or injection molding. Without intent to be bound by theory, it is believed that this relationship in temperatures may affect the manner by which the polyamide-based pigment masterbatch forms streaks within the volume of the neutralized acid copolymer.

The polyamide-based pigment masterbatch of the molded article may be any polyamide-based pigment masterbatch prepared by known processes including melt blending of a polyamide with one or more suitable dyes or pigments that collectively function as the first pigment of the molded article. Any type of dyestuff or pigment is suitable, provided that it is stable at the high temperatures encountered during molding processes.

Example dyestuffs include monoazo complexes, in particular, chromium complexes that are sufficiently stable at the high working temperatures encountered in molding processes. Additional examples of dyestuffs include halogen-containing triazinyl or vinyl group-containing metallized azo dyestuffs, in particular, those metallized with chromium, nickel, or copper.

Still further examples of pigments suitable for the polyamide-based pigment masterbatch of the molded articles according to embodiments include carbon black, nigrosine; metal-based pigments such as cadmium pigments (yellow, red, green, orange); chromium pigments (yellow, green); cobalt pigments (violet, blue, cerulean, yellow); cooper pigments (azurite, purple, blue, green, phthalocyanine blue, phthalocyanine green), iron oxide pigments (oxide red, ochre, Prussian blue); lead pigments (lead white, yellow, red, lead-tin yellow); manganese pigments (violet, blue); mercury pigments (vermillion); titanium pigments (yellow, beige, white, black); zinc pigments (white, ferrite, yellow), and aluminum powder. Still further examples of pigments suitable for the polyamide-based pigment masterbatch of the molded articles according to embodiments include inorganic pigments such as carbon black (including vine black, lamp black), ivory black (bone charcoal); clay earth pigments (iron oxides, yellow ochre, raw sienna, burnt sienna, raw umber, burnt umber); ultramarine pigments and those pigments from biological and non-biological origin such as alizarin (synthesized), alizarin crimson (synthesized), gamboge, cochineal red, rose madder, indigo, Indian yellow, Tyrian purple, quinacridone, magenta, phthalo green, phthalo blue, pigment red 170, and diarylide yellow.

Still further examples of pigments suitable for the polyamide-based pigment masterbatch of the molded articles according to embodiments include organic or inorganic pigments such as perylene, perinone, quinacridone, quinacridonequinone, anthraquinone, anthanthrone, benzimidazolone, di-azo condensation compounds, azo compounds, indanthrone, phthalocyanine, triarylcarbonium, dioxazine, triphendioxazine, aminoanthraquinone, diketopyrrolopyrrole, indigo, thioindigo, thiazineindigo, isoindoline, isoindolinone, pyranthrone, isoviolanthrone, flavanthrone, anthrapyrimidine or carbon black pigments, mixed crystals or mixtures thereof; or inorganic pigments such as titanium dioxide, zinc sulfide, zinc oxide, iron oxide, chromium oxide, mixed metal oxide (such as nickel rutile yellow, chromium rutile yellow, cobalt blue, cobalt green, zinc iron brown, spinel black), cadmium, bismuth, chromate, ultramarine, and iron blue pigments and mixtures thereof, and mixtures of organic and inorganic pigments. Further examples of first pigments suitable for the polyamide-based pigment masterbatch of the molded articles according to embodiments include carbon black, Pigment Yellow 192, Pigment Orange 68 and Pigment Red 149.

According to embodiments, the molded article includes, in addition to the first pigment associated with the polyamide of the polyamide-based pigment masterbatch, a second pigment and an oil-based carrier. Both the second pigment and the oil-based carrier are derived from a liquid-based pigment masterbatch. In contrast to the first pigment, which remains associated with the polyamide of the polyamide-based pigment masterbatch formulation, the second pigment and the oil-based carrier are not necessarily associated with each other within the molded article. In embodiments, the second pigment may be present in the molded article as a second secondary phase, and the oil-based carrier may be present in the molded article as a third secondary phase separate from the second secondary phase. The second pigment and the oil-based carrier are derived from a liquid-based pigment masterbatch in that, when the molded article is produced, the liquid-based pigment masterbatch is added to the raw neutralized acid copolymer prior to the molding process. During the molding process, the second pigment is dispersed throughout the copolymer material to impart a coloring effect on the copolymer as a whole. Nevertheless, the oil-based carrier remains within the molded article as a detectable artefact of the means by which the second pigment was added, namely, the liquid-based pigment masterbatch.

The molded article according to embodiments, may include from 0.1% to 5%, or from 0.5% to 4%, or from 0.5% to 3%, or from 0.5% to 2.5% by weight second pigment derived from the liquid-based pigment masterbatch, based on the total weight of the molded article; and from 0.1% to 0.7%, or from 0.1% to 0.5%, or from 0.1% to 0.3%, or from 0.1% to 0.2%, or from 0.05% to 0.2% by weight oil-based carrier derived from the liquid-based pigment masterbatch, based on the total weight of the molded article. In some embodiments, the molded article may include multiple second pigments and oil-based carriers each derived from separate liquid-based colorants. In such embodiments, the foregoing weight percents describing the second pigment and the oil-based carrier in the molded article refer to the combined total weights of all second pigments and oil-based carriers in the molded article.

The liquid-based pigment masterbatch from which the second pigment and the oil-based carrier of the molded article are derived necessarily includes the second pigment and the oil-based carrier. The liquid-based pigment masterbatch may be any colorant formulation that is in liquid form, that is chemically compatible with the neutralized acid copolymer, and that is stable at typical temperatures of extrusion or injection molding processes. The second pigment may be any pigment that is chemically compatible with the neutralized acid copolymer, and that is stable at typical temperatures of extrusion or injection molding processes. The oil-based carrier may be any non-polar liquid in which the second pigment is substantially soluble.

Examples of pigments suitable as the second pigment of the molded article include, without limitation, organic or inorganic pigments. Such organic or inorganic pigments may be selected from black pigments, yellow pigments, magenta pigments, red pigments, violet pigments, cyan pigments, blue pigments, green pigments, orange pigments, brown pigments, and white pigments. In some instances, the organic or inorganic pigments may include spot-color pigments, which are formed from a combination of a predefined ratio of two or more primary color pigments.

Non-limiting examples of suitable inorganic black pigments include carbon black. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® L, MONARCH® 700, MONARCH® 800, MONARCH® 880, MONARCH® 900, MONARCH® 1000, MONARCH® 1100, MONARCH® 1300, and MONARCH® 1400); and various black pigments manufactured by Evonik Degussa Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). A non-limiting example of an organic black pigment includes aniline black, such as C.I. Pigment Black 1.

Non-limiting examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, Pigment Yellow 155, C.I. Pigment Yellow 167, C.I. Pigment Yellow 172, and C.I. Pigment Yellow 180.

Non-limiting examples of suitable magenta or red or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48 (Ca), C.I. Pigment Red 48 (Mn), C.I. Pigment Red 57 (Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Non-limiting examples of blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Non-limiting examples of green organic pigments include C.I. Pigment Green 1, C.I. Pigment Green 2, C.I. Pigment Green, 4, C.I. Pigment Green 7, C.I. Pigment Green 8, C.I. Pigment Green 10, C.I. Pigment Green 36, and C.I. Pigment Green 45.

Non-limiting examples of brown organic pigments include C.I. Pigment Brown 1, C.I. Pigment Brown 5, C.I. Pigment Brown 22, C.I. Pigment Brown 23, C.I. Pigment Brown 25, and C.I. Pigment Brown, C.I. Pigment Brown 41, and C.I. Pigment Brown 42.

Non-limiting examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

Organic pigments suitable as the second pigment may include, for example, azo compounds, azomethine, methine, anthraquinone, phthalocyanine, perinone, perylene, diketopyrrolopyrrole, thioindigo, iminoisoindoline, dioxazine, iminoisoindolinone, quinacridone, flavanthrone, indanthrone, anthrapyrimidine and quinophthalone pigments, or a mixture or solution thereof.

Suitable inorganic pigments for the second pigment of the molded articles according to embodiments may include, for example, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, or mixtures thereof.

The oil-based carrier of the liquid-based pigment masterbatch may be any fluidic carrier chemically compatible with the second pigment. Examples of oil-based carriers include mineral oil, cyclopentasiloxane, cyclohexasiloxane, isoparaffinic fluids, polyethylene glycols, and polyisobutylene, or mixtures of these. In specific example embodiments, the oil-based carrier of the liquid-based pigment masterbatch is mineral oil. In further specific example embodiments, the oil-based carrier of the liquid-based pigment masterbatch is polyisobutylene. In further specific example embodiments, the oil-based carrier of the liquid-based pigment masterbatch is a mixture of mineral oil and polyisobutylene. In further specific example embodiments, the oil-based carrier of the liquid-based pigment masterbatch is a mixture of a polyethylene glycol and polyisobutylene. In further specific example embodiments, the oil-based carrier of the liquid-based pigment masterbatch is a mixture of a polyethylene glycol and mineral oil.

Examples of liquid-based pigment masterbatches may include from 5% to 60%, or from 10% to 60%, or from 15% to 60%, or from 20% to 60% by weight second pigment, based on the total weight of the liquid-based pigment masterbatch; and from 40% to 95%, or from 40% to 90%, or from 40% to 85%, or from 40% to 80% by weight oil-based carrier, based on the total weight of the liquid-based pigment masterbatch.

In some example embodiments of the molded article, the second pigment is a metallic pigment, is a metallic colorant, or includes metallic flakes, and the oil-based carrier is a mixture of polyisobutylene and mineral oil. In such embodiments, the second pigment and the oil-based carrier may be derived from a liquid-based pigment masterbatch, in which the oil-based carrier includes from 30% to 70% by weight polyisobutylene, based on the total weight of the oil-based carrier; and from 30% to 70% by weight mineral oil, based on the total weight of the oil-based carrier.

In some example embodiments of the molded article, the second pigment is a non-metallic colorant, and the oil-based carrier is a mixture of a polyethylene glycol and mineral oil. In such embodiments, the second pigment and the oil-based carrier may be derived from a liquid-based pigment masterbatch, in which the oil-based carrier includes from 10% to 30% by weight polyethylene glycol, based on the total weight of the oil-based carrier; and from 70% to 90% by weight mineral oil, based on the total weight of the oil-based carrier.

The molded article according to embodiments may have any shape or size. In some embodiments, the molded article may be a bottle or a cap of a bottle intended for use in the cosmetics industry or for purposes for which the decorative effect imparted by the first pigment and the second pigment may be desirable.

Having described embodiments of molded articles, embodiments of methods for preparing the molded articles will now be described. Methods for preparing a molded article according to any of the foregoing embodiments may include dry blending a neutralized acid copolymer, a nylon-based pigment masterbatch, and a liquid-based pigment masterbatch to form an initial mixture. The neutralized acid copolymer and the nylon-based pigment masterbatch may be in a bulk form such as pellets or a powder. The liquid-based pigment masterbatch may be added in liquid form to a combination of the neutralized acid copolymer and the nylon-based pigment masterbatch prior to the dry blending that results in the initial mixture.

In the methods for preparing the molded articles, the initial mixture may be fed to a molding apparatus such as an injection molding apparatus. The initial mixture is molded in the molding apparatus to form the molded article by any suitable molding technique with standard process conditions.

In the methods for preparing the molded articles, the initial mixture may include at least 75%, or at least 80%, or at least 85%, or at least 90%, or at least 95% by weight neutralized acid copolymer, based on the total weight of the initial mixture. The initial mixture may further include from 0.1% to 5%, from 0.1% to 0.4%, from 0.1% to 0.3%, or from 0.1% to 0.2% by weight polyamide-based pigment masterbatch, based on the total weight of the initial mixture. In some embodiments, the initial mixture may include multiple polyamide-based pigment masterbatches. In such embodiments, the initial mixture may include a total of from 0.1% to 5%, from 0.1% to 0.4%, from 0.1% to 0.3%, or from 0.1% to 0.2% by combined weight of all polyamide-based pigment masterbatches, based on the total weight of the initial mixture.

In the methods for preparing the molded articles, the initial mixture may further include from 0.2% to 5.7%, or from 0.2% to 5%, or from 0.2% to 4%, or from 0.2% to 3%, or from 0.2% to 2%, or from 0.2% to 1.5%, or from 0.2% to 1% by weight liquid-based pigment masterbatch, based on the total weight of the initial mixture. In some embodiments, the initial mixture may include multiple liquid-based pigment masterbatches. In such embodiments, the initial mixture may include a total of from 0.2% to 5.7%, or from 0.2% to 5%, or from 0.2% to 4%, or from 0.2% to 3%, or from 0.2% to 2%, or from 0.2% to 1.5%, or from 0.2% to 1% by combined weight of all liquid-based pigment masterbatches, based on the total weight of the initial mixture.

The neutralized acid copolymer, the polyamide-based pigment masterbatches, including the first pigment and the polyamide, and liquid-based pigment masterbatches, including the second pigment and the oil-based carrier, all have been described previously with respect to embodiments of the molded article.

As a component of the initial mixture, the polyamide-based pigment masterbatch may include from 30% to 95% by weight polyamide, based on the total weight of the polyamide-based pigment masterbatch, and from 5% to 70% by weight of a first pigment associated with the polyamide, based on the total weight of the nylon-based pigment masterbatch. As a component of the initial mixture, the liquid-based pigment masterbatch may include from 5% to 60% by weight of a second pigment, based on the total weight of the liquid-based pigment masterbatch, and from 40% to 95% by weight of an oil-based carrier, based on the total weight of the liquid-based pigment masterbatch. In embodiments, the initial mixture as a whole may include from 0.1% to 5% by weight second pigment and from 0.1% to 0.7%, or from 0.1% to 0.6%, or from 0.1% to 0.5%, or from 0.1% to 0.4% by weight oil-based carrier, based on the total weight of the initial mixture. Without intent to be bound by theory, it is believed that an excess of oil-based carrier in the initial mixture may contribute to undesirable viscosity characteristics of the initial mixture that may under some circumstances render the initial mixture incapable of being formed into molded articles by injection molding.

Embodiments of the molded articles according to this disclosure should be understood to include embodiments of molded articles prepared according to an embodiment of a method according to this disclosure or by any other suitable method that results in a molded article as described in this disclosure.

Unless otherwise defined, all technical and scientific terms used herein have the same meaning as commonly understood by one of ordinary skill in the art of molded articles or molding technologies. The terminology used in the description herein is for describing particular embodiments only and is not intended to be limiting. As used in the specification and appended claims, the singular forms "a," "an," and "the" are intended to include the plural forms as well, unless the context clearly indicates otherwise.

EXAMPLES

The embodiments of molded articles and their associated preparation methods will be better understood by reference to the following examples, which are offered by way of illustration and which one skilled in the art of molded articles or molding technologies will recognize are not meant to be limiting.

General Injection Molding Procedure

To demonstrate various decorative effects that may be attained in molded articles, initial mixtures were prepared according to a predetermined decorative design by dry-blending a mixture of ionomer resin, at least one polyimide-based pigment masterbatch, and at least one liquid-based pigment masterbatch. The dry-blended mixtures were then fed to an injection molding apparatus to assess whether the initial mixture as formulated was suitable for producing molded articles.

The ionomer resin of all of the following examples was an ethylene acid copolymer comprising about 15% to about 30% by weight copolymerized units of acrylic acid or methacrylic acid, based on the total weight of the parent acid copolymer. The ionomer has a melt flow rate from about 4.5 g/10 min measured according to ASTM D1238 at 190° C. with a 2160-g load. In the ionomer, about 40% to about 70% of the total carboxylic acid groups of the copolymer are neutralized to carboxylic acid salts comprising sodium cations.

Polyamide-based pigment masterbatches in the examples were commercially available formulations including nylon-6 as the polyimide component. Liquid-based pigment masterbatches in the examples were commercially available formulations including a pigment and an oil-based carrier. Oil-based carriers in the liquid-based pigment masterbatches included one or more of polyethylene glycol, mineral oil, and polyisobutylene, along with one or more additional additives. Additional ingredients in the initial mixtures are described in greater detail with their respective examples.

The following Table 1 summarizes the parameters of the injection molding process that was applied in all examples:

TABLE 1

General Injection Molding Parameters for the Examples

| Parameter | Sub-Parameter | Value |
| --- | --- | --- |
| Temperature Profile | Nozzle | 220° C. |
| | Zone 2 | 215° C. |
| | Zone 3 | 215° C. |
| | Zone 4 | 215° C. |
| | Melt | ~230° C. |
| Mold | Fix Plate | 20° C. |
| | Moving Plate | 25° C. |
| | Slides | 20° C. |
| Pressure | Injection 1 | 110 bar |
| | Holding | 90 bar |
| | Back Pressure | 0 bar |
| Times | Injection | 4 s |
| | Holding | 12 s |
| | Cooling | 20 s |
| | SRT | 13 s |
| | Total Cycle | 65 s |
| Screw Rotation | | 70 rpm |
| Injection Speed 1 | | 10 mm/s |
| Screw Retraction | | 70 mm |
| Suck Back | | 30 mm |
| Cushion | | 3.5 mm |

Example 1

An initial mixture was prepared including 98.6% by weight ionomer resin, 0.4% by weight polyamide based pigment masterbatch having a light-brown first pigment, and 1.0% by weight liquid-based pigment masterbatch having a white second pigment. The polyamide-based pigment masterbatch included nylon-6 as the polyamide in combination with the light-brown first pigment. The liquid-based pigment had a colorant density of 2.26 g/cm$^3$ and contained about 87.1% by weight second pigment and about 12.9% by weight oil-based carrier. The oil-based carrier included about 20% by weight polyethylene glycol and about 80% by weight mineral oil. Thus, the initial mixture contained 98.6% by weight ionomer resin, 0.4% by weight polyamide-based light-brown first pigment, 0.87% by weight white second pigment, and 0.13% by weight oil-based carrier.

Molded articles were successfully prepared by subjecting the initial mixture to the injection molding process of the previously described General Injection Molding Procedure. The molded articles exhibited a solid white color having light-brown streaks resembling white marble.

Example 2

An initial mixture was prepared including 98.7% by weight ionomer resin, 0.15% by weight polyamide based pigment masterbatch having a light-brown first pigment, 0.15% by weight polyamide based pigment masterbatch having a white first pigment, and 1.0% by weight liquid-based pigment masterbatch having a black second pigment. The light-brown polyamide-based pigment masterbatch included nylon-6 as the polyamide in combination with the light-brown first pigment. The white polyamide-based pigment masterbatch included nylon-6 as the polyamide in combination with the white first pigment and included about 55% to 65% by weight polyamide in combination with about 35% to 45% by weight titanium dioxide (TiO$_2$) as the white pigment. Thus, the initial mixture contained 98.6% by weight ionomer resin, 0.6% total by weight polyamide-based first pigments, and 1.0% by weight second pigment in oil-based carrier.

Molded articles were successfully prepared having the weight proportions of the initial mixture by subjecting the initial mixture to the injection molding process of the previously described General Injection Molding Procedure. The molded articles exhibited a solid black color having white and light-brown streaks resembling black marble.

Example 3

An initial mixture was prepared including 98.8% by weight ionomer resin, 0.2% by weight polyamide based pigment masterbatch having a black first pigment, and 1.0% by weight liquid-based pigment masterbatch having a white second pigment. The polyamide-based pigment masterbatch included about 88% to about 92% by weight nylon-6 as the polyamide in combination with about 8% to about 12% by weight carbon black as the black first pigment. The liquid-based pigment had a colorant density of 2.26 and contained about 87.1% by weight second pigment and about 12.9% by weight oil-based carrier. The oil-based carrier included about 20% by weight polyethylene glycol and about 80% by weight mineral oil. Thus, the initial mixture contained 98.8% by weight ionomer resin, 0.2% by weight polyamide-based black first pigment, 0.87% by weight white second pigment, and 0.13% by weight oil-based carrier.

Molded articles were successfully prepared having the weight proportions of the initial mixture by subjecting the initial mixture to the injection molding process of the previously described General Injection Molding Procedure. The molded articles exhibited a solid white color having black streaks resembling white marble with dark veining.

Example 4

An initial mixture was prepared including 98.5% by weight ionomer resin, 0.2% by weight polyamide based pigment masterbatch having a light-brown first pigment, 0.3% by weight polyamide based pigment masterbatch having a black first pigment, and 1% by weight liquid-based pigment masterbatch having a metallic copper second pigment. The light-brown polyamide-based pigment masterbatch included nylon-6 as the polyamide in combination with the light-brown first pigment. The black polyamide-based pigment masterbatch included about 88% to about 92% by weight nylon-6 as the polyamide in combination with about 8% to about 12% by weight carbon black as the black first pigment. The liquid-based pigment had a colorant density of 1.12 g/cm$^3$ and contained about 60.8% by weight second pigment and about 39.2% by weight oil-based carrier. The oil-based carrier contained about 50% by weight polyisobutylene and about 50% by weight mineral oil. Thus, the initial mixture contained 98.5% by weight ionomer resin, 0.5% total by weight polyamide-based light-brown and black first pigments, 0.61% by weight metallic copper second pigment, and 0.39% by weight oil-based carrier.

Molded articles were successfully prepared having the weight proportions of the initial mixture by subjecting the initial mixture to the injection molding process of the previously described General Injection Molding Procedure. The molded articles exhibited a metallic decorative effect resembling antique brass, in which subtle black and brown streaks were present on a brass-like metallic template.

Example 5

An initial mixture was prepared including 98.3% by weight ionomer resin, 0.2% by weight polyamide based pigment masterbatch having a light-brown first pigment, 0.2% by weight polyamide based pigment masterbatch having a black first pigment, and 1.3% by weight liquid-based pigment masterbatch having a metallic copper second pigment. The light-brown polyamide-based pigment masterbatch included nylon-6 as the polyamide in combination with the light-brown first pigment. The black polyamide-based pigment masterbatch included about 88% to about 92% by weight nylon-6 as the polyamide in combination with about 8% to about 12% by weight carbon black as the black first pigment. The liquid-based pigment had a colorant density of 0.94 g/cm$^3$ and contained about 24.2% by weight second pigment and about 75.8% by weight oil-based carrier. The oil-based carrier contained about 20% by weight polyethylene glycol and about 80% by weight mineral oil. Thus, the initial mixture contained 98.3% by weight ionomer resin, 0.4% total by weight polyamide-based light-brown and black first pigments, 0.79% by weight metallic copper second pigment, and 0.51% by weight oil-based carrier.

Molded articles were successfully prepared having the weight proportions of the initial mixture by subjecting the initial mixture to the injection molding process of the previously described General Injection Molding Procedure. The molded articles exhibited a metallic decorative effect resembling rustic copper, in which subtle black and brown streaks were present on a copper-like metallic template.

Comparative Example 1

An initial mixture was prepared by slightly varying the formulation of the initial mixture of Example 4 through replacing the 1% by weight liquid-based pigment masterbatch having a metallic copper second pigment from Example 4 with 1% by weight of an alternative liquid-based pigment masterbatch having a metallic copper second pigment. Whereas the liquid-based pigment masterbatch from Example 4 contained about 60.8% by weight second pigment and about 39.2% by weight oil-based carrier composed of about 50% by weight polyisobutylene and about 50% by weight mineral oil, the alternative liquid-based pigment masterbatch contained about 24.2% by weight second pigment and about 75.8% by weight oil-based carrier composed of about 20% by weight polyethylene glycol and about 80% by weight mineral oil. Thus, the initial mixture for the present example included equal parts by weight ionomer resin (98.5%), and total polyimide-based pigments (0.5%) as did the initial mixture of Example 4. However, whereas the Example 4 initial mixture included about 0.61% by weight metallic copper second pigment and 0.39% by weight oil-based carrier, the initial mixture of the present example included 0.24% by weight metallic copper second pigment, and 0.76% by weight oil-based carrier.

By the previously described General Injection Molding Procedure, molded articles could not be produced from the initial mixture of the present example, owing to screw slippage during the molding process. It is believed that the increased amount of oil-based carrier present in the initial mixture adversely affected the viscosity and flow characteristics of the initial mixture, rendering the mixture unable to be injection molded.

Comparative Example 2

An initial mixture was prepared by slightly varying the formulation of the initial mixture of Example 5 through replacing the 1.3% by weight liquid-based pigment masterbatch having a metallic copper second pigment from Example 5 with 1.3% by weight of an alternative liquid-based pigment masterbatch having a metallic copper second pigment. Whereas the liquid-based pigment masterbatch from Example 5 contained about 60.8% by weight second pigment and about 39.2% by weight oil-based carrier composed of about 50% by weight polyisobutylene and about 50% by weight mineral oil, the alternative liquid-based pigment masterbatch contained about 24.2% by weight second pigment and about 75.8% by weight oil-based carrier composed of about 20% by weight polyethylene glycol and about 80% by weight mineral oil. Thus, the initial mixture for the present example included equal parts by weight ionomer resin (98.3%), and total polyimide-based pigments (0.4%) as did the initial mixture of Example 5. However, whereas the Example 5 initial mixture included about 0.79% by weight metallic copper second pigment and 0.51% by weight oil-based carrier, the initial mixture of the present example included 0.31% by weight metallic copper second pigment, and 0.99% by weight oil-based carrier.

By the previously described General Injection Molding Procedure, molded articles could not be produced from the initial mixture of the present example, owing to screw slippage during the molding process. It is believed that the increased amount of oil-based carrier present in the initial mixture adversely affected the viscosity and flow characteristics of the initial mixture, rendering the mixture unable to be injection molded.

Analytical Characterizations of Molded Articles

Final compositions of molded articles prepared according to the foregoing description and Examples may be determined by known analytical techniques. Examples of suitable analytical techniques will now be described.

Oil-Based Carrier Determination

Oil-based carrier derived from liquid-based pigment masterbatch may be confirmed in neutralized acid copolymer molded articles by common analytical techniques. Examples of oil-based carriers include, without limitation, mineral oil, polyisobutylene (PIB), polyethylene glycol (PEG), or combinations of these.

To confirm the presence of the oil-based carrier in the molded article, a sample of the molded article may be cryoground and extracted into a suitable solvent such as hexanes or methylene chloride. The resulting solution is then concentrated by evaporation of some or all of the solvent. The extracted material is then redissolved into a solvent suitable for analysis by NMR or two-dimensional gas chromatography (GC×GC).

Polyethylene glycol from oil-based carriers may be identified qualitatively and quantified by $^1$H NMR using standard techniques at levels below 100 ppm. The analysis may be performed directly on a sample solution prepared from the article even without cryogrinding and extraction. The lowest detection limits are attainable by performing the analysis on extracted samples. Polyethylene glycol and polyisobutylene may be identified qualitatively and quantified by $^{13}$C NMR using standard techniques to levels of about 100 ppm. The analysis may be performed directly on a sample solution prepared from the article even without cryogrinding and extraction. The lowest detection limits are attainable by performing the analysis on extracted samples.

As described in detail in M. Biederman et al., *Journal of Chromatography A* volume 1375 (2015), pages 146-153, comprehensive two-dimensional gas chromatography (GC× GC) is capable of distinguishing mineral oil saturated hydrocarbons (MOSH) from polymer oligomeric saturated hydrocarbons (POSH). Mass spectrometry (MS) is used for identification of the compounds, and a flame ionization detector (FID) is used for quantitation. High-pressure liquid chromatographic fractionation may be used prior to GC×GC-MS analysis.

Pigment Weight Percent in Liquid-Based Pigments Molded Articles

Pigment weight percent in liquid-based pigment masterbatches may be determined from measurements of solids content in the masterbatches. A known weight of a liquid-based pigment masterbatch is diluted in a solvent such as hexanes and centrifuged under conditions that enable recovery and drying of the solids. The pigment weight percent in the original masterbatch is the weight of the recovered and dried solids divided by the original weight of the masterbatch diluted in the solvent, divided by 100.

Pigment Weight Percent in Molded Articles

Quantitative determination of total weight amount of pigments in neutralized acid copolymer molded articles, relative to the total weight of the molded article, may be determined by thermogravimetric analysis (TGA) of a sample of molded article.

Qualitative and Quantitative Determination of Pigments in Molded Articles

The neutralized acid copolymer molded articles according to the present disclosure and the Examples contain the neutralized acid copolymer, a first pigment derived from a polyimide-based pigment masterbatch (such as a nylon-based pigment masterbatch, for example), and a second pigment derived from a liquid-based pigment masterbatch. The presence of the two pigments in the molded articles, the origin of the pigments from either the polyimide-based masterbatch or the liquid-based masterbatch, and their weight fractions relative to the total weight of the molded article, may be determined by standard analytical techniques. In principle, the analytical techniques rely on the observation that the first pigment, derived from the polyimide-based pigment masterbatch, remains associated with its polyimide-based carrier as a discrete phase in the molded article, separate from or non-homogeneously mixed with a phase including the neutralized acid copolymer and the second pigment derived from the liquid-based pigment masterbatch. Moreover, the first pigment and the second pigment may themselves be mutually insoluble with each other in their respective carriers. For example, the first pigment may not be soluble in the oil-based carrier of the liquid-based pigment masterbatch, and the second pigment may not be soluble in or compatible with the polyamide-based carrier of the polyamide-based pigment masterbatch.

Qualitative and quantitative determinations of the first pigment and the second pigment in the neutralized acid copolymer molded articles may be performed on the molded article itself without dissolving the molded article. For example, a sample of the molded article may be analyzed by scanning electron microscopy (SEM) in combination with energy dispersive spectroscopy (EDS). The combination of microscopy and elemental analysis provides a quantitative spatial map of the elemental composition of the sample. Because in the molded article the polyamide-based first pigment is not homogeneously dispersed throughout the copolymer matrix of the molded article, the first pigment is observed within polyamide domains of the sample independently from the second pigment in the continuous phase.

Qualitative and quantitative determinations of the first pigment and the second pigment in the neutralized acid copolymer molded articles may be performed on cryoground samples of the molded article. Owing to a substantial difference in solubilities of polyamides and ethylene-based copolymer, the cryoground sample may be selectively dissolved with solvent combinations that separate a polyamide phase containing the first pigment from a copolymer phase containing the second pigment. The resulting solutions are dried and analyzed by thermogravimetric analysis (TGA) to determine the pigment content in each phase. An example of a TGA protocol for determining an amount of carbon black pigment in a plastic, where the carbon black pigment is derived from a nylon-based masterbatch is available in TA Instruments Thermal Analysis Application Brief Number TA-122, entitled "Determination of Carbon Black Pigment in Nylon 66 by TGA." This TGA protocol is readily adaptable to determinations of other pigment molecules and to various molded plastics/copolymers.

Qualitative and quantitative determinations of the first pigment and the second pigment in the neutralized acid copolymer molded articles may be performed by elemental analysis (CHNO), from which pigment weight percents relative to the total weight of the molded article may be determined from only a few milligrams of sample from the molded article.

To perform the elemental analysis with regard to the first pigment from the polyamide-based pigment masterbatch, a portion of the polyamide phase of the molded article sufficient for the analysis is removed from the molded article by mechanical means such as drilling or grinding. The removed portion is subjected to conventional elemental analysis.

To perform the elemental analysis with regard to the second pigment from the liquid-based pigment masterbatch, a similar technique may be applied, except that the sample removed from the molded article is removed from outside the polyamide phase, that is, in the continuous phase of colored acid neutralized copolymer. However, for this analysis, the neutralized acid copolymer composition (CHNO content) must also be known, so that the elemental contents of the copolymer may be subtracted from the elemental analysis of the continuous phase to arrive at the elemental contents of the second pigment. Determination of the neutralized acid copolymer composition is accurately measured by NMR using standard techniques well understood to those of ordinary skill in the art.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A molded article having a decorative effect, the molded article comprising:
at least 75% by weight, based on the total weight of the molded article, of a neutralized acid copolymer;
from 0.1% to 5% by weight, based on the total weight of the molded article, of a polyamide-based pigment masterbatch, the polyamide-based pigment masterbatch comprising from 30% to 95% by weight polyamide, based on the total weight of the polyamide-based pigment masterbatch, and from 5% to 70% by weight of a first pigment associated with the polyamide, based on the total weight of the polyamide-based pigment masterbatch; and from 0.1% to 5% by weight, based on the total weight of the molded article, of a second pigment derived from a liquid-based pigment masterbatch; and from 0.1% to 0.7% by weight, based on the total weight of the molded article, of oil-based carrier derived from the liquid-based pigment masterbatch.

2. The molded article of claim 1, wherein:
the neutralized acid copolymer is a continuous phase within the molded article;
the polyamide-based pigment masterbatch is present as a first secondary phase within the molded article;
the second pigment is present as a second secondary phase within the molded article;
the oil-based carrier is present as a third secondary phase within the molded article; and
the first secondary phase is not homogeneously distributed within the continuous phase.

3. The molded article of claim 1, wherein the liquid-based pigment masterbatch comprises:
from 5% to 60% by weight, based on the total weight of the liquid-based pigment masterbatch, of the second pigment; and
from 40% to 95% by weight, based on the total weight of the liquid-based pigment masterbatch, of the oil-based carrier.

4. The molded article of claim 1, wherein the neutralized acid copolymer is an ionomer resin having a melt flow index from 4 g/10 min to 6 g/10 min, as measured according to ASTM D1238.

5. The molded article of claim 1, wherein the neutralized acid copolymer is an ethylene methacrylic acid copolymer in which methacrylic acid groups of the copolymer are at least partially neutralized with sodium ions.

6. The molded article of claim 1, wherein:
the neutralized acid copolymer comprises 15% to 30% by weight copolymerized units of acrylic acid or methacrylic acid, and 70% to 85% by weight copolymerized units of ethylene, based on the total weight of the neutralized acid copolymer; and
about 40% to about 70% of carboxylic acid groups of the neutralized acid copolymer are neutralized as carboxylic acid salts comprising sodium cations.

7. The molded article of claim 1, wherein the oil-based carrier comprises, polyisobutylene, polyethylene glycol, mineral oil, or a combination thereof.

8. The molded article of claim 1, wherein:
the second pigment is a metallic colorant; and
the oil-based carrier comprises:
from 30% to 70% by weight polyisobutylene, based on the total weight of the oil-based carrier; and
from 30% to 70% by weight mineral oil, based on the total weight of the oil-based carrier.

9. The molded article of claim 1, wherein:
the second pigment is a non-metallic colorant; and
the oil-based carrier comprises:
from 10% to 30% by weight polyethylene glycol, based on the total weight of the oil-based carrier; and
from 70% to 90% by weight mineral oil, based on the total weight of the oil-based carrier.

10. The molded article of claim 1, wherein the first pigment is selected from the group consisting of carbon black, nigrosine, metal-based pigments cadmium pigments, chromium pigments, cobalt pigments, copper pigments, iron oxide pigments, lead pigments, manganese pigments, mercury pigments, titanium pigments, zinc pigments, aluminum powder, vine black, lamp black, ivory black, clay earth pigments, iron oxides, yellow ochre, raw sienna, burnt sienna, raw umber, burnt umber, ultramarine pigments, alizarin, alizarin crimson, gamboge, cochineal red, rose madder, indigo, Indian yellow, Tyrian purple, quinacridone, magenta, phthalo green, phthalo blue, pigment red 170, and diarylide yellow.

11. The molded article of claim 1, wherein the polyamide-based pigment masterbatch is a nylon-based pigment masterbatch and the polyamide is nylon-6.

12. The molded article of claim 1, wherein the molded article is a decorative cap for a bottle.

13. A method for preparing a molded article, the method comprising:
dry blending a neutralized acid copolymer, a polyamide-based pigment masterbatch, and a liquid-based pigment masterbatch to form an initial mixture;
feeding the initial mixture to an injection molding apparatus;
molding the initial mixture with the injection molding apparatus to form the molded article,
wherein:
the initial mixture comprises, based on the total weight of the mixture:
at least 75% by weight of the neutralized acid copolymer;
from 0.1% to 5% by weight of the polyamide-based pigment masterbatch; and
from 0.2% to 5.7% by weight of the liquid-based pigment masterbatch;
the polyamide-based pigment masterbatch comprises from 30% to 95% by weight polyamide, based on the total weight of the polyamide-based pigment masterbatch, and from 5% to 70% by weight of a first pigment associated with the polyamide, based on the total weight of the polyamide-based pigment masterbatch;
the liquid-based pigment masterbatch comprises from 5% to 60% by weight, based on the total weight of the liquid-based pigment masterbatch, of a second pigment, and from 40% to 95% by weight, based on the total weight of the liquid-based pigment masterbatch, of an oil-based carrier.

14. The method of claim 13, wherein:
the neutralized acid copolymer is a continuous phase within the molded article;
the polyamide-based pigment masterbatch is present as a first secondary phase within the molded article;
the second pigment is present as a second secondary phase within the molded article;
the oil-based carrier is present as a third secondary phase within the molded article; and
the first secondary phase is not homogeneously mixed within the continuous phase.

15. The method of claim 13, wherein the oil-based carrier comprises, polyisobutylene, polyethylene glycol, mineral oil, or a combination thereof.

16. The method of claim 13, wherein:
the second pigment is a metallic colorant; and
the oil-based carrier comprises:
from 30% to 70% by weight polyisobutylene, based on the total weight of the oil-based carrier; and from 30% to 70% by weight mineral oil, based on the total weight of the oil-based carrier.

17. The method of claim 13, wherein:
the second pigment is a non-metallic colorant; and
the oil-based carrier comprises:
 from 10% to 30% by weight polyethylene glycol, based on the total weight of the oil-based carrier; and
 from 70% to 90% by weight mineral oil, based on the total weight of the oil-based carrier.

18. The method of claim 13, wherein the polyamide-based pigment masterbatch is a nylon-based pigment masterbatch and the polyamide is nylon-6.

19. The method of claim 13, wherein the molded article is a decorative cap for a bottle.

20. A molded article prepared by the method according to claim 13.

* * * * *